H. G. TRIPP.
OIL GUARD FOR PULLEYS.
APPLICATION FILED JAN. 7, 1911.
1,055,574.
Patented Mar. 11, 1913.
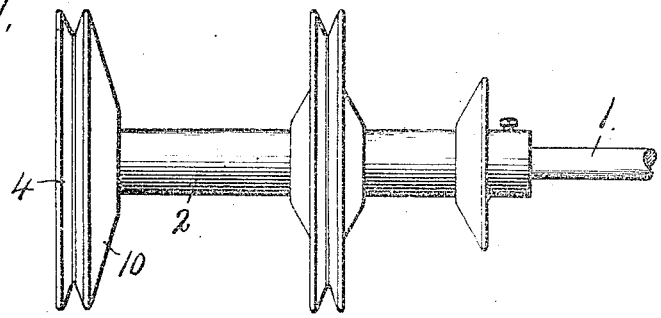
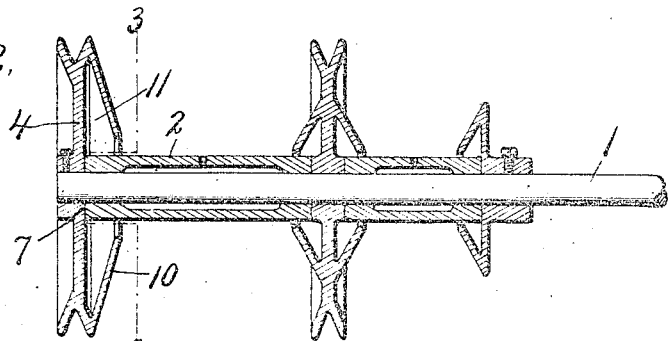
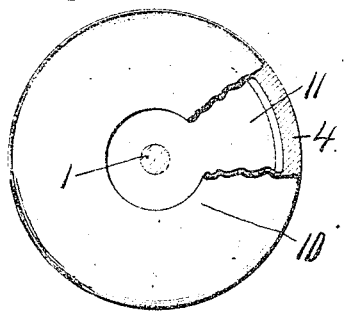
WITNESSES
INVENTOR
Harry G. Tripp
BY
ATTORNEY

UNITED STATES PATENT OFFICE.

HARRY G. TRIPP, OF AUBURN, NEW YORK.

OIL-GUARD FOR PULLEYS.

1,055,574.  Specification of Letters Patent. Patented Mar. 11, 1913.

Application filed January 7, 1911. Serial No. 601,384.

*To all whom it may concern:*

Be it known that I, HARRY G. TRIPP, of Auburn, in the county of Cayuga, in the State of New York, have invented new and useful Improvements in Oil-Guards for Pulleys, of which the following, taken in connection with the accompanying drawings, is a full, clear, and exact description.

This invention relates to certain improvements in oil guards for pulleys and other elements revolving in suitable bearings and requiring more or less lubrication to permit freedom of operation and to avoid excessive wear by friction.

In the use of dental engines and other machines or instruments, the power transmitting connections between the motor and operating tool must of necessity be extremely flexible to permit the tool to be shifted from place to place and to be directed to its work at all angles and it therefore becomes necessary to employ a considerable number of pulleys, idlers, gears and other elements usually revolving at a high rate of speed and forming parts of the power transmitting mechanism. These revolving parts are of course supported in or upon suitable lubricated bearings, and even though the running joint between the revolving members and their bearings may be as close and perfect as possible to permit ease of action, the lubricant will in short time find its way through the joint and onto the surface of the revolving member from which it is thrown by centrifugal force around the room in which the apparatus is located and frequently comes in contact with and ruins the wearing apparel of those who may be in the room, such, for example, as the dentist or patient, thereby resulting in considerable damage and loss to the proprietor of the business.

The main object, therefore, of my invention is to obviate these undesirable conditions by providing the revolving elements with annular pockets or channels, in which any oil escaping from the bearings is trapped by centrifugal force and prevented from escaping by the same force from the periphery or rim of the pulley or other revolving element.

Other objects and uses relating to specific parts of the device will be brought out in the following description.

In the drawings: Figure 1 is an elevation of a portion of the shaft and bearings showing different forms of revolving elements such as a shaft, tight and loose pulleys and a collar on the shaft. Fig. 2 is a lengthwise sectional view of the elements shown in Fig. 1. Fig. 3 is a transverse sectional view taken on line 3—3 of Fig. 2 except that the full circumference is shown and a portion of a guard flange is broken away to disclose the adjacent portion of the annular pocket.

In Figs. 1 and 2, I have shown a revolving shaft 1 journaled in a suitable bearing 2 and provided with a tight pulley 4 having its end arranged in close proximity to and forming a reasonably tight running joint 7, with the end of the bearing 2.

The side of the pulley —4— facing the bearing —2— is provided with a frusto-conical or concavo-convex guard flange —10— having its base united to or integral with the adjacent side of the pulley some distance from and concentric with the axis of the bearing —2— so as to form an oil tight junction with said pulley, the remaining portions of the flange being spaced apart from the adjacent face of the pulley to form an intervening annular groove or pocket —11—, which is registered with the running joint —7— so that any oil which may escape through such joint will be thrown outwardly by centrifugal force of the pulley and trapped in the groove —11— or between the guard flange —10— and adjacent face of the pulley. The apex or small end of the guard flange is therefore extended inwardly some distance beyond the running joint —7— and preferably surrounds the adjacent end of the bearing in close proximity thereto but without contacting therewith, the object of which is to cause any oil which may lodge on the inner concave face of the guard flange to be thrown by centrifugal force against the outer side of the groove where it is trapped and held by the same force during rotation of the pulley and thereby prevented from escaping or being thrown off by the pulley.

It will be seen from the foregoing description that the main feature of the invention lies in providing the revolving element with an annular groove or pocket, registering with the running joint between said revolving member and bearing for the purpose of receiving and trapping any oil which may escape from said running joint and thereby preventing such oil from being thrown by centrifugal force from the periphery of said revolving member into the room in which the apparatus is located.

I have discovered that in the action of an ordinary pulley unprovided with these guard flanges, the oil escaping from the running joint is forced outwardly by centrifugal force and capillary attraction along the surface and from the periphery of the pulley and that this centrifugal force and capillary attraction tends to draw by suction other quantities of oil from the bearings through the running joint, but by providing the guard flanges forming the subject matter of my present invention this centrifugal and capillary action is checked, thereby reducing the incidental suction of the oil through the running joint to a minimum and not only conserving the oil but effectively preventing said oil from being thrown by centrifugal force from the periphery of the pulley around the room in which it is located.

What I claim is:

In combination with a bearing, and a revolving pulley having a running joint therewith, a frusto-conical flange united at its base with a side face of the pulley at a point near the periphery of the pulley, the bearing extending through the apex of the flange to the running joint, the apex of the flange being free from connection with the bearing, and extending some distance beyond the running joint to overlie the same, the flange and the flange carrying side face of the pulley forming an annular pocket in transverse alinement with the joint.

In witness whereof I have hereunto set my hand on this 31st day of December 1910.

HARRY G. TRIPP.

Witnessed by—
 FREDERICK S. REIGLE,
 HUGH W. REYNOLDS.